Figure 1:
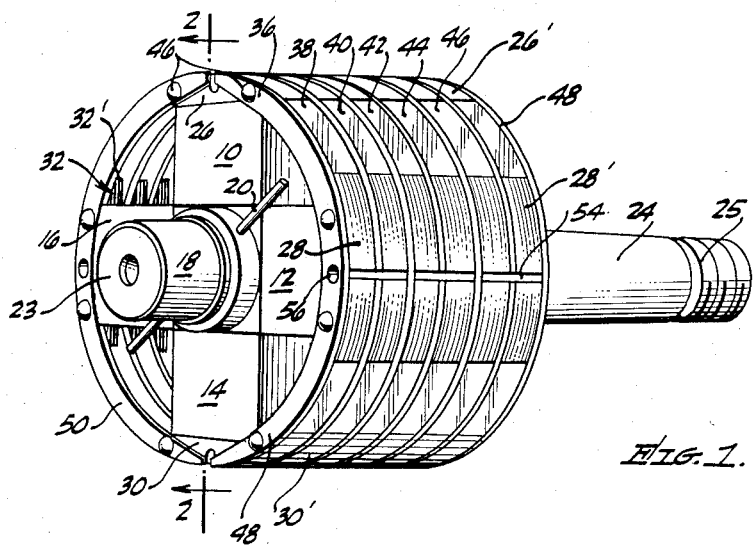

March 10, 1959  W. F. CARR  2,877,366

PERMANENT MAGNET ROTOR

Filed April 1, 1957

INVENTOR.
WILLIAM F. CARR,
BY
Perry E. Turner
AGENT.

United States Patent Office 2,877,366
Patented Mar. 10, 1959

2,877,366

PERMANENT MAGNET ROTOR

William F. Carr, Santa Monica, Calif., assignor to Lear, Incorporated

Application April 1, 1957, Serial No. 649,669

2 Claims. (Cl. 310—156)

This invention relates to rotating electrical machinery, and more particularly to an improved method and means providing a rotor of the permanent magnet type for use in motors and generators.

In the assembly of rotors having a plurality of magnets, considerable difficulty has been experienced in securing the parts so as to obtain a structure which will stand up at high speeds and over a long operating life. For example, in a four-pole machine wherein four permanent magnets are to be positioned between a supporting shaft and the pole-shoes, it is extremely difficult to assemble the parts so that the forces holding the magnets in place are substantially equal. Consequently, one or more magnets become loosened at high rotational speeds, with resulting inefficient operation and eventual structural failure of the rotor as a whole.

It is an object of this invention to provide an improved permanent magnet rotor for motors and generators, wherein a plurality of permanent magnets are held in place by substantially equal forces.

It is another object of this invention to provide an improved magnet rotor of the type employing a plurality of permanent magnets disposed between a central shaft and respective pole-shoes, which comprises a minimum number of component parts of simple design and rugged construction, capable of maintaining its shape and operating efficiently at extremely high speeds over a long operating life.

The above and other objects and advantages of this invention will become apparent upon a consideration of the following description, taken in conjunction with the accompanying drawing, in which a preferred embodiment is illustrated by way of example. The scope of the invention is pointed out in the appended claims. In the drawing, Fig. 1 is a perspective view of a permanent magnet rotor assembly, in accordance with this invention, and Fig. 2 is a sectional view taken along line 2—2 of Fig. 1.

Briefly, in accordance with one embodiment of this invention, a permanent magnet rotor comprises a plurality of axially spaced non-magnetic rings of spring metal to support laminations forming the pole-shoes, a central shaft and respective permanent magnets surrounding the shaft and held between the shaft and pole-shoes by the spring action of the ring elements. The rings are of sufficient thickness and number to hold the magnets in place in the presence of high centrifugal forces which cause destruction of prior art rotors.

Figure 2:
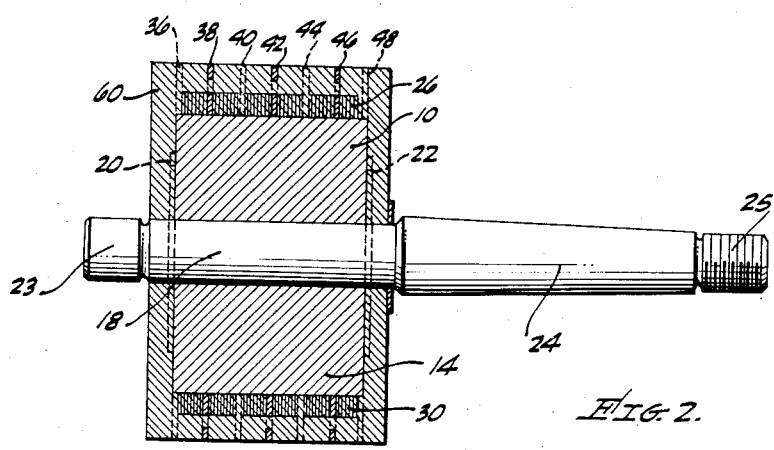

Referring to Figs. 1 and 2, there is illustrated a four-pole rotor in accordance with this invention, which includes four permanent magnets 10, 12, 14, and 16 of equal cross-section abutting a central shaft 18. In such four-pole machine, the portion of the shaft against which the permanent magnets are seated is preferably of square cross-section. Further, the square portion of the shaft is at least as long as the permanent magnets, so that the entire inner surface of each magnet is in mating engagement with a flat surface of the shaft. At the opposite ends of the permanent magnets, a pair of rods 20, 22 extend through the shaft transversely to the axis thereof. In Fig. 2, rods 20, 22 are shown dotted, it being understood that they are positioned as indicated in Fig. 1. The exterior or end portions of shaft 18 may be of any desired shape; in this illustration the end portions 23, 24 of the shaft are of cylindrcial cross section, with one end portion 24 tapered and provided with a threaded extension 25 to receive a driving or driven member (not shown).

Surrounding the permanent magnets, and holding them securely in place, is a cage structure comprising four laminated pole pieces 26, 28, 30, 32 and a plurality of axially spaced, non-magnetic coupling rings 36, 38, 40, 42, 44, 46, 48. The laminations, indicated at 26′, 28′, 30′, 32′, are of conventional shape, each having a straight inner edge to register against the outer surface of the associated magnet, and an outer edge curved to match the periphery or circumference of the rotor.

As shown, the coupling rings, which preferably are of stainless steel, separate the pole piece laminations into axially spaced groups, and the rings and laminations are secured together, as by rivets 46. Also as illustrated, each coupling ring is composed of two substantially semi-circular segments, such as the segments 48, 50 shown for ring 36. Preferably, and in accordance with this invention, each ring has its segments oriented 90° with respect to the segments of adjacent rings. Thus, where the ends of the segments 48, 50 of ring 36 are located at pole pieces 26 and 30, the ends of the segments of the next ring 38 are located at pole pieces 28, 32. In the example shown, therefore, the ends of the segments of the alternate rings 36, 40, 44 and 48 are located at pole pieces 26, 30, and the ends of the segments of the alternate rings 38, 42 and 46 are located at pole pieces 28, 32. By thus arranging the rings, stresses on the ends of the segments, and hence on the pole pieces to which they are attached, are distributed. In this connection, it will be appreciated that if the rings were all oriented the same way, so that the ends of their segments were secured to the same pole pieces, stresses due to centrifugal forces would tend to concentrate on those pole pieces to force them apart.

It will be apparent that the rings also may be one-piece rings, and this invention embraces that form. However, a cost saving is realized by forming the rings of semi-circular segments as above described; this will be understood when it is considered that for a sheet of material of given size, semi-circular ring elements more than double the number of one-piece rings can be obtained.

The laminations forming a pole piece may be notched at the center of their outer edges so that, in assembly, the pole piece is provided with a slot, as indicated at 54 for pole piece 28. In the construction of this invention, each slot is interrupted by alternate coupling rings. To correct this, the coupling rings are provided with openings, where necessary, which are aligned with the slot; opening 56 in segment 48 illustrates this provision. Thus arranged, an element or material constituting a damper bar may be inserted in the slots; preferably, the material used for potting in completing the assembly provides the damper bar.

In assembly of the parts, after the rings and pole pieces have been assembled to form the cage, this cage is placed on end, and the magnets are placed on their ends in the desired positions, leaving a rectangular opening. Shaft 18, which is slightly over-size, is forced or pressed into this opening, whereby the magnets are forced radially to be firmly seated against the pole pieces. An important feature of this invention resides in using rings of spring metal, and which will resiliently deform to accommodate a structure wherein the magnets differ slightly in size. After the shaft and magnets have been inserted within the cage, the spring tension of the coupling rings insures that the magnets are held in place under substantially equal forces. At high rotational speeds, therefore, there is no loosening of parts due to unequal forces, such as occurs in prior art rotors.

An important advantage in a rotor constructed in accordance with this invention lies in the fact that only two surfaces of each magnet have to be machined—the surfaces which abut the shaft 18 and the associated pole piece. The cost saving over other structures, wherein magnets have to be machined on four or more surfaces, will be readily apparent.

The rotor is completed by placing the assembly in a mold and potting to fill all openings and crevices. Preferably aluminum is used as the potting material, and is injected in liquid state and under pressure. As shown in Fig. 2, rods 20, 22 are imbedded in the potting material; in this manner, rods 20, 22 and potting material 60 effectively enlarge shaft 18 for torques applied to the shaft, i. e., instead of being concentrated on the shaft, the torques are effectively applied to a larger mass which includes shaft 18, rods 20, 22 and potting material 60. Thus, rods 20, 22 form a rigid mechanical connection between the shaft and the potting material, to aid in achieving a rotor structure of greater compactness and mechanical strength than has heretofore been possible. Rods 20, 22 are illustrated as straight cylindrical rods. However, it will be apparent that rods of different shapes may be used. Further, the rods may be replaced by equivalent structures, e. g., the shaft itself may have radially flared portions to be embedded in the potting material.

Rotors of the type above described have been found to hold together at rotational speeds in excess of permanent magnet rotors heretofore known, and to insure better performance over a longer operating life for alternators in which they are employed. For example, for a 400-cycle alternator, a 4-pole rotor of 3.14-inch outer diameter weighing approximately 3.75 pounds, was found to operate safely at 12,000 R. P. M. continuously over more than 500 hours, during which time no parts were loosened. It was further found that such rotor withstood stresses up to 20,000 R. P. M. before failure occured. It has also been found that the speeds at which a rotor in accordance with this invention can safely be rotated are determined by the size, number and quality of the coupling rings; by careful design and use of coupling rings of high-quality stainless steel, rotors will rotate safely at 30,000 R. P. M.

A two-pole rotor may be made in the same manner as the four-pole machine above described, merely by replacing two oppositely disposed magnets (e. g., magnets 26–30) with bars of aluminum, and by replacing the laminations of the associated pole pieces with aluminum laminations. Alternatively, the laminations of such pole pieces may be eliminated, and the coupling rings shaped with straight inner edges to provide seats for the aluminum bars.

Rotors with a greater number of poles are fashioned in the manner above described. The shaft 18 is provided with as many flat surfaces as there are magnets.

What is claimed is:

1. A rotor comprising an annular cage formed of circumferentially spaced magnetic poles, spaced non-magnetic ring elements secured to said poles, magnets within the cage, a central shaft, and said ring elements being of spring metal and operative to hold each pole against the magnet and the magnets against the shaft with substantially equal pressures, each of said ring elements including two semi-circular segments, the semi-circular segments of each ring element being angularly displaced 90° with respect to the semi-circular segments of adjacent ring elements, whereby none of the magnets is subject to movement and vibration relative to the others during rotation of the rotor.

2. In a magnetic rotor, a central shaft, a plurality of permanent magnet blocks spaced about the periphery of said shaft, said blocks being magnetized so that the adjacent portions thereof are magnetic poles of opposite plurality, a pole shoe in registry with each of said blocks, each of said pole shoes comprising a plurality of laminations of magnetizable material, a plurality of axially spaced ring elements of non-magnetic material interspersed with the laminations of the pole shoes, said laminations and said ring elements being secured together, and said ring elements being of spring metal and functioning to hold the pole shoes against the magnets and the magnets against the shaft with equal pressures, each said ring element including two semi-circular segments and the semi-circular segments of each ring element being angularly displaced 90° with respect to the semi-circular segments of adjacent ring elements.

References Cited in the file of this patent
UNITED STATES PATENTS

| | | |
|---|---|---|
| 2,493,102 | Brainard | Jan. 3, 1950 |

FOREIGN PATENTS

| | | |
|---|---|---|
| 604,762 | Great Britain | July 9, 1948 |
| 994,928 | France | Aug. 14, 1951 |